(12) United States Patent
Park et al.

(10) Patent No.: US 10,310,727 B2
(45) Date of Patent: Jun. 4, 2019

(54) DEVICE AND METHOD FOR DISPLAYING A PART OF A WEB PAGE IN A DROP AREA AND TRANSMITTING THE PART OF THE WEBPAGE TO A SEPARATE DISPLAY APPARATUS

(71) Applicant: Samsung Electronics Co., Ltd., Suwon-si, Gyeonggi-do (KR)

(72) Inventors: Jong-chan Park, Seoul (KR); Im-kyeong You, Seoul (KR); Sun-young Han, Suwon-si (KR); Kang-min Lee, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 346 days.

(21) Appl. No.: 14/580,973

(22) Filed: Dec. 23, 2014

(65) Prior Publication Data

US 2015/0177943 A1    Jun. 25, 2015

(30) Foreign Application Priority Data

Dec. 24, 2013  (KR) .................. 10-2013-0162436

(51) Int. Cl.
*G06F 3/0486* (2013.01)
*G06F 3/0484* (2013.01)
*H04M 1/725* (2006.01)

(52) U.S. Cl.
CPC ....... *G06F 3/0486* (2013.01); *H04M 1/72522* (2013.01); *H04M 2250/22* (2013.01)

(58) Field of Classification Search
CPC .. G06F 3/0486; G06F 3/04842; G06F 3/1454; G06F 3/1423; G06F 3/1431; G06F 1/1632; G06F 3/0484; G06F 3/14; G06F 1/1647; G06F 9/4445; H04M 1/72522; H04M 2250/22

See application file for complete search history.

(56) References Cited

U.S. PATENT DOCUMENTS

| 8,144,006 | B2 | 3/2012 | Thomas |
| 8,335,539 | B1 | 12/2012 | Wu |
| 2009/0046075 | A1* | 2/2009 | Kim .................. G06F 3/0488 345/173 |

(Continued)

FOREIGN PATENT DOCUMENTS

| KR | 10-2004-0014527 A | 2/2004 |
| KR | 10-2004-0045503 A | 6/2004 |
| KR | 10-2013-0134603 A | 12/2013 |

*Primary Examiner* — Tan H Tran
(74) *Attorney, Agent, or Firm* — Jefferson IP Law, LLP

(57) ABSTRACT

Apparatuses and methods related to a user terminal and a control method thereof are provided. More particularly, apparatuses and methods relate to a user terminal which enables a user to select a part of an image and to transmit the part of the image to a display apparatus. The user terminal includes a display unit configured to display an image and a drop area thereon, a communication portion configured to be connected to a display apparatus, and a controller configured to select at least a part of an image of the display unit by receiving a user's input, and if the selected part of the image is dragged and dropped into the drop area, controls the communication portion to transmit the selected part of the image to the display apparatus.

10 Claims, 12 Drawing Sheets

(56) References Cited

U.S. PATENT DOCUMENTS

| | | | |
|---|---|---|---|
| 2010/0289923 A1* | 11/2010 | Jang | H04N 1/00291 348/239 |
| 2011/0157057 A1* | 6/2011 | Hata | G06F 1/1681 345/173 |
| 2012/0191832 A1* | 7/2012 | Kim | H04L 12/2812 709/223 |
| 2013/0278484 A1 | 10/2013 | Hwang et al. | |
| 2013/0326397 A1 | 12/2013 | Kim et al. | |
| 2013/0328878 A1 | 12/2013 | Stahl et al. | |
| 2014/0009394 A1* | 1/2014 | Lee | H04N 5/4403 345/157 |
| 2014/0012898 A1* | 1/2014 | Mittal | G06F 17/30899 709/203 |
| 2015/0121238 A1* | 4/2015 | Lee | H04L 67/06 715/738 |

* cited by examiner

DEVICE AND METHOD FOR DISPLAYING A PART OF A WEB PAGE IN A DROP AREA AND TRANSMITTING THE PART OF THE WEBPAGE TO A SEPARATE DISPLAY APPARATUS

CROSS-REFERENCE TO RELATED APPLICATION(S)

This application claims the benefit under 35 U.S.C. § 119(a) of a Korean patent application filed on Dec. 24, 2013 in the Korean Intellectual Property Office and assigned Ser. No. 10-2013-0162436, the entire disclosure of which is hereby incorporated by reference.

TECHNICAL FIELD

The present disclosure relates to a user terminal and a control method thereof. More particularly, the present disclosure relates to a user terminal and a control method thereof configured to enable a user to select a part of an image and to transmit the part of the image to a display apparatus.

BACKGROUND

Current smart phones may transmit what is displayed on their screens, to a larger screen such as a Television (TV) through service such as screen mirroring so that those displayed by the smart phone screens may be also displayed as is by the larger screen.

However, existing mirroring services that are used to transmit the entire screen of a user's smart phone as is may cause privacy issues since screens of the user's smart phone which a user does not intend to share is shared. Further, since the entire screen of the user's smart phone is shared, it is difficult to display only a particular photo or a particular content of the smart phone screen in the TV, and it is not easy for a user to use other services of the smart phone while sharing the screen of the smart phone through the TV.

If a user intends to check incoming calls or texts on his/her smart phone located in another place while watching TV, it is necessary to minimize privacy infringement in watching TV with other people.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a user terminal and a control method thereof configured to display a part of an image selected by a user, in a drop area and to transmit the part of the image to a display apparatus and to enable a user to share the image of the user terminal in the display apparatus.

In accordance with an aspect of the present disclosure, a user terminal and a control method thereof configured to transmit reconfigured User Interface (UI) information is provided. The user terminal and the control method includes transmitting a preset item of a plurality of items or including items except for the item selected by a user, to a display apparatus and enabling a user to check the status of the user terminal from the display apparatus without privacy infringement.

In accordance with another aspect of the present disclosure, a user terminal is provided. The user terminal includes a display unit configured to display an image and a drop area thereon, a communication portion configured to be connected to a display apparatus, and a controller configured to select at least a part of an image of the display unit by receiving a user's input, and if the selected part of the image is dragged and dropped into the drop area, controls the communication portion to transmit the selected part of the image to the display apparatus.

According to an aspect of the present disclosure, the controller may display the selected part of the image in the drop area if the selected part of the image is dragged and dropped into the drop area.

According to an aspect of the present disclosure, the controller may maintain the image displayed in the drop area if the image displayed on the display unit is changed.

According to an aspect of the present disclosure, the controller may select the drop area that displays the selected part of the image therein and switches the image displayed in the drop area with the image displayed on the display unit.

According to an aspect of the present disclosure, the controller may control the switched image displayed on the display unit to control a screen of the display apparatus.

According to an aspect of the present disclosure, the drop area may be displayed as a movable pop-up.

According to an aspect of the present disclosure, the controller may transmit synchronization information of content to the display apparatus if the image displayed in the drop area is the content.

In accordance with another aspect of the present disclosure, a control method of a user terminal is provided. The control method includes connecting to a display apparatus, displaying an image and a drop area on a display unit of the user terminal, selecting at least a part of the image by receiving a user's input, and transmitting the selected part of the image to the display apparatus if the selected part of the image is dragged and dropped into the drop area.

According to an aspect of the present disclosure, the control method of a user terminal may include displaying the selected part of the image in the drop area if the selected part of the image is dragged and dropped into the drop area.

According to an aspect of the present disclosure, the control method of a user terminal may include maintaining the image displayed in the drop area if the image of the display unit is changed.

According an aspect of the present disclosure, the control method of a user terminal may further include selecting the drop area that displays the selected part of the image therein and switching the image displayed in the drop area with the image displayed on the display unit.

According to an aspect of the present disclosure, the control method of a user terminal may further include controlling the switched image that is displayed on the display unit to control a screen of the display apparatus.

According to an aspect of the present disclosure, the transmitting to the display apparatus may include transmitting synchronization information of the content to the display apparatus if the image displayed in the drop area is content.

In accordance with another aspect of the present disclosure, a user terminal is provided. The user terminal includes a display unit configured to display a UI including a plurality of items thereon, a communication portion configured to be connected to a display apparatus, and a controller configured to determine a reconfigured UI including a preset item of the plurality of items or including items except for at least one item selected by a user by receiving the user's input and configured to control the communication portion to transmit the determined reconfigured UI information to the display apparatus.

According to an aspect of the present disclosure, the plurality of items may include at least one of message reception by the user terminal, call reception by the user terminal, remaining battery, sound mode, and vibration mode.

According to an aspect of the present disclosure, the controller may transmit the event occurrence information to the display apparatus if a predetermined event occurs with respect to the part of items included in the reconfigured UI.

In accordance with another aspect of the present disclosure, a control method of a user terminal is provided. The control method includes connecting to a display apparatus, displaying a UI including a plurality of items, determining a reconfigured UI including a preset item of the plurality of items or including items except for at least one item selected by a user by receiving the user's input, and transmitting the determined reconfigured UI information to the display apparatus.

The plurality of items may include at least one of message reception by the user terminal, call reception by the user terminal, remaining battery, sound mode and vibration mode.

The control method of a user terminal may include transmitting the event occurrence information to the display apparatus if a particular event occurs with respect to the part of items included in the reconfigured UI.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above other aspects, features, and advantages of certain embodiments of the present disclosure will be more apparent from the following description taken in conjunction with the accompanying drawings, in which.

The same reference numerals are used to represent the same elements throughout the drawings.

DETAILED DESCRIPTION

The following description with reference to the accompanying drawings is provided to assist in a comprehensive understanding of various embodiments of the present disclosure as defined by the claims and their equivalents. It includes various specific details to assist in that understanding, but these are to be regarded as merely exemplary. Accordingly, those of ordinary skill in the art will recognize that various chances and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the present disclosure. Accordingly, it should be apparent to those skilled in the art that the following description of various embodiments of the present disclosure is provided for illustration purposes only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Hereinafter, features of respective elements of a user terminal according to an embodiment of the present disclosure are described below with reference to FIG. 1, and FIGS. 6 to 9 as necessary.

Figure 1:
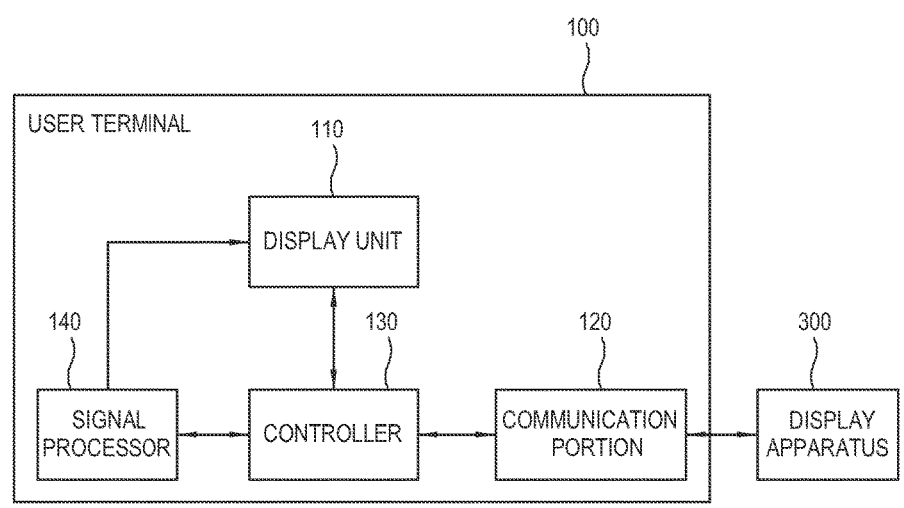
FIG. 1 is a block diagram of a user terminal according to an embodiment of the present disclosure.

FIG. 1 is a block diagram of a user terminal according to an embodiment of the present disclosure.

Referring to FIG. 1, a user terminal 100 includes a display unit 110, a communication portion 120, a controller 130 and signal processor 140, and is connected to a display apparatus 300. The user terminal 100 may be implemented as, for example, a smart phone, and the display apparatus 300 may be implemented as a television (TV), a Personal Computer (PC), a laptop computer or a tablet PC. The user terminal 100 is connected to the display apparatus 300, and displays an image and a drop area on the display unit 110. The user terminal 100 selects at least a part of an image by receiving a user's input, and if the selected part of the image is dragged and dropped into a drop area, the user terminal 100 transmits the selected part of the image to the display apparatus 300. The user terminal 100 displays the part of the image selected by a user, in the drop area, transmits the selected part of the image to the display apparatus 300, and enables a user to share the image of the user terminal 100 with the display apparatus 300.

The communication portion 120 is connected to the display apparatus 300. For example, the communication portion 120 may be connected to the display apparatus 300 such as a TV, a PC, a laptop computer, or a table PC, and as another example, may be connected to a plurality of display apparatuses 300.

The signal processor 140 receives an image signal and processes the image signal according to a preset image processing operation. The type of the image processing operation performed by the signal processor 140 may include, without limitation, decoding, de-interlacing, scaling, noise reduction, detail enhancement, and the like. The signal processor 140 may be implemented as a System-On-a-Chip (SOC) which integrally performs the foregoing functions, or as an image processing board (not shown) in which individual elements are installed to perform the foregoing functions independently.

The display unit 110 displays an image and a drop area thereon based on an image signal that is output by the signal processor 140. The image may include at least one of an image, a photo, a web page, broadcasting content, video content, and menu items of a plurality of applications that is displayed by the user terminal 100. The drop area may be displayed as a movable pop-up. The display unit 110 may be implemented as various displays including, without limitation, a Plasma Display Panel (PDP), a Liquid Crystal Display (LCD), an Organic Light-Emitting Diode (OLED) and a flexible display.

The controller 130 may select at least a part of an image displayed on the display unit 110 by receiving a user's input, and if the selected part of the image is dragged and dropped into the drop area, the controller 130 may control the communication portion 120 to transmit the selected part of the image to the display apparatus 300. If the selected part of the image is dragged and dropped into the drop area, the controller 130 may display the selected part of the image in the drop area.

Figure 6:
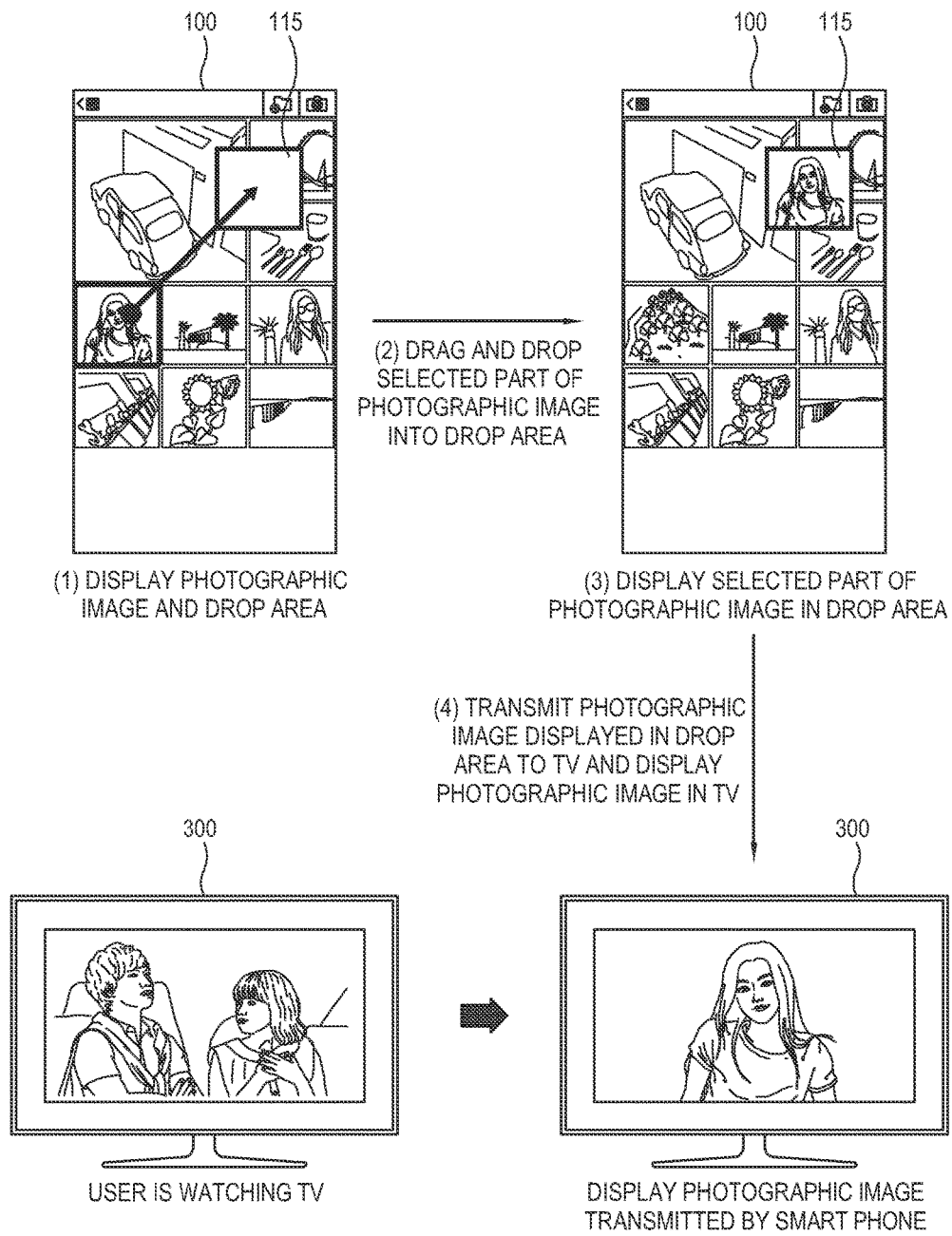
FIG. 6 illustrates an example of an operation for displaying a part of a photographic image in a drop area and transmitting the photographic image to a display apparatus according to another embodiment of the present disclosure.

FIG. 6 illustrates an example of an operation for displaying a part of a photographic image in a drop area and transmitting the photographic image to a display apparatus according to another embodiment of the present disclosure.

Referring to FIG. 6, a user selects the display apparatus 300 from the user terminal 100 and connects the display apparatus 300 to the user terminal 100. The available display apparatus 300 may be a TV, a PC or a tablet PC that may be connected through a local network such as Wi-Fi or Bluetooth. The user terminal 100 implements a predetermined service and displays the drop area 115 therein while displaying a photographic image in a screen. A user decides a predetermined range and selects at least a part of the photographic image displayed in the screen, by using an available input means such as a finger touch, a touch pen, or a keypad. If the at least a part of the photo selected by a user is dragged and dropped into the drop area 115, the selected photographic image is displayed in the drop area 115, and the displayed photographic image is transmitted to the display apparatus 300 such as a TV that is connected to the user terminal 100 by a user. A user who is watching TV views the photographic image that has been transmitted by the user terminal 100 and is currently displayed in the TV screen. As a result, a user may share the photographic image stored in his/her user terminal 100, with other people through a TV that has a larger screen. In particular, the user shares only certain photos displayed in the screen of the user terminal 100, rather than the entire screen of the user terminal 100, with other people and thus may share only photos that he/she intends to share, without privacy infringement.

Figure 7:
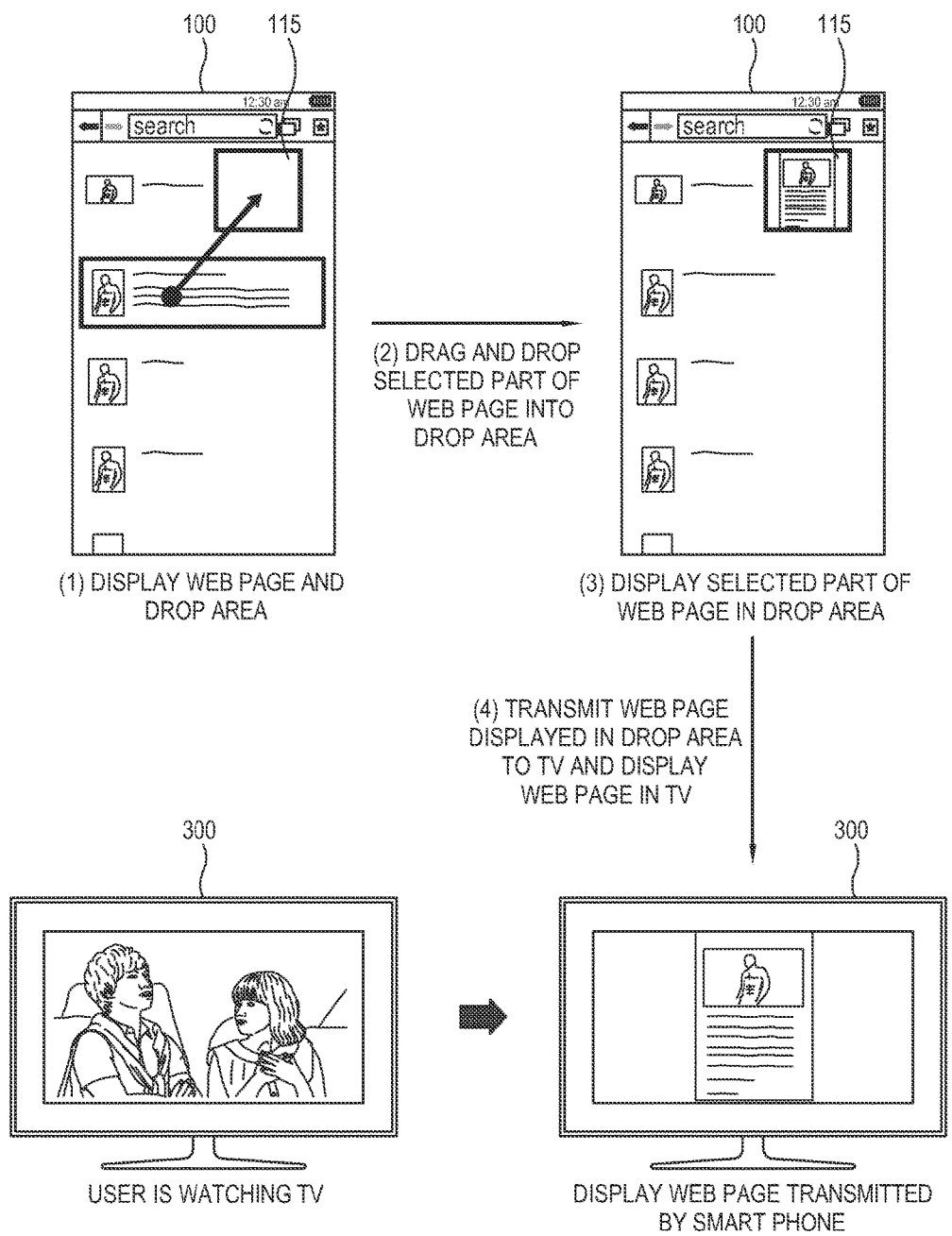
FIG. 7 illustrates an example of an operation for displaying a part of a web page in a drop area and transmitting the part of the web page to a display apparatus according to another embodiment of the present disclosure.

FIG. 7 illustrates an example of an operation for displaying a part of a web page in a drop area and transmitting the part of the web page to the display apparatus according to another embodiment of the present disclosure.

Referring to FIG. 7, a user decides a particular range of a web page displayed in a screen of the user terminal 100 and selects at least a part of the web page. If the selected part of the web page is dragged and dropped into the drop area 115, the selected web page is displayed in the drop area 115, and the displayed web page is transmitted to the display apparatus 300 such as a TV. A user who is watching TV views the web page that has been transmitted by the user terminal 100 and is currently displayed in the TV screen. The user may easily transmit only the selected web page to the TV screen excluding other content stored in the user terminal 100 by selecting the web page that he/she intends to share from his/her user terminal 100 and by dragging the selected web page to the drop area 115 to, without privacy issue.

Figure 8:
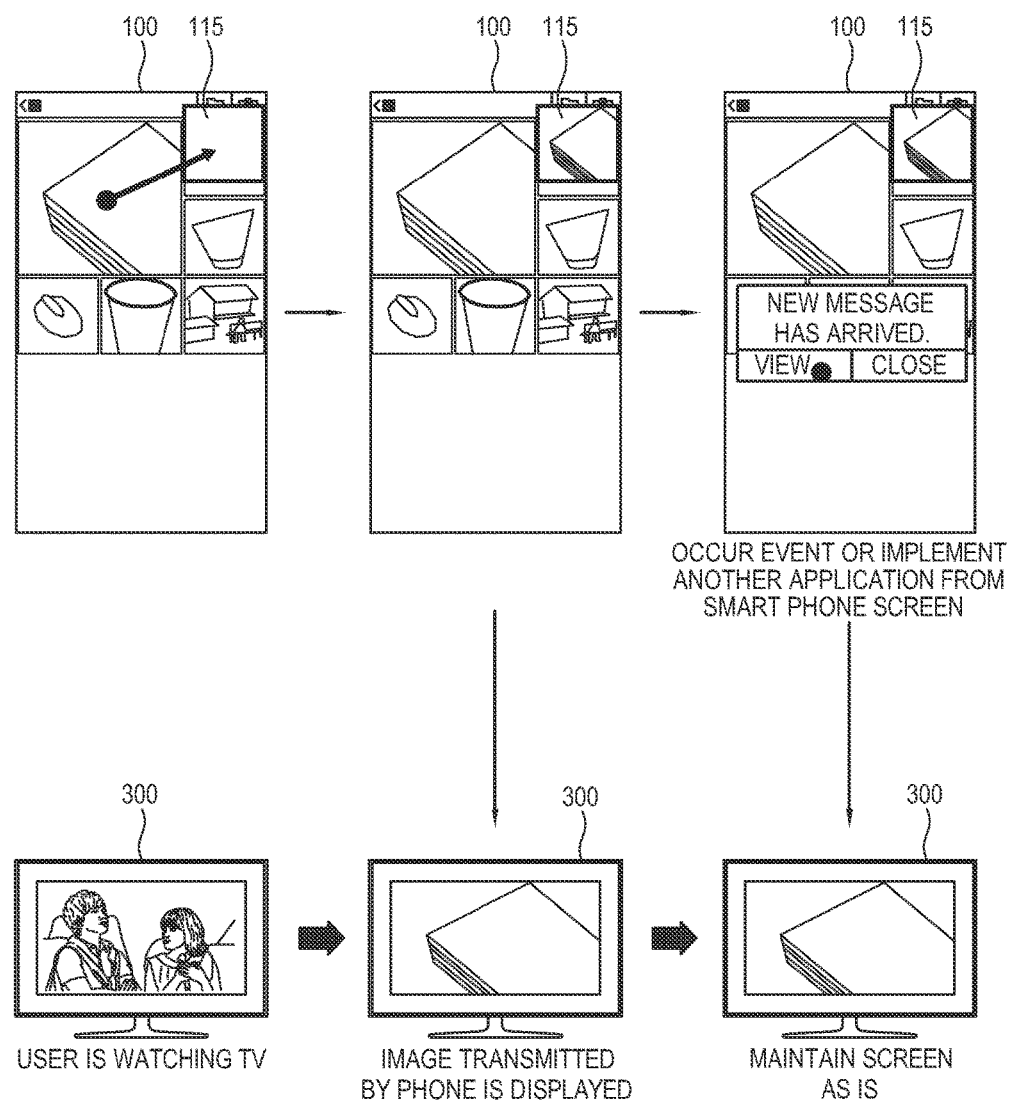
FIG. 8 illustrates an example of an operation performed by a user terminal according to another embodiment of the present disclosure.

FIG. 8 illustrates an example of an operation performed by a user terminal according to another embodiment of the present disclosure.

Referring to FIG. 8, if an image that is displayed on the display unit 110 is changed, the controller 130 may maintain the image displayed in the drop area. As shown in FIG. 8, if an event for informing an arrival of a new message occurs or another application is executed while the user terminal 100 displays a photographic image therein, the drop area 115 that displays the photographic image selected by a user maintains the displayed photographic image, and the connected display apparatus 300 also maintains the screen displaying the photographic image. While a user drags and drops the photographic image from the user's terminal 100 into the TV and displays the photographic image in the TV, the user terminal 100 may receive a text message, or execute another application and perform other functions.

Figure 9:
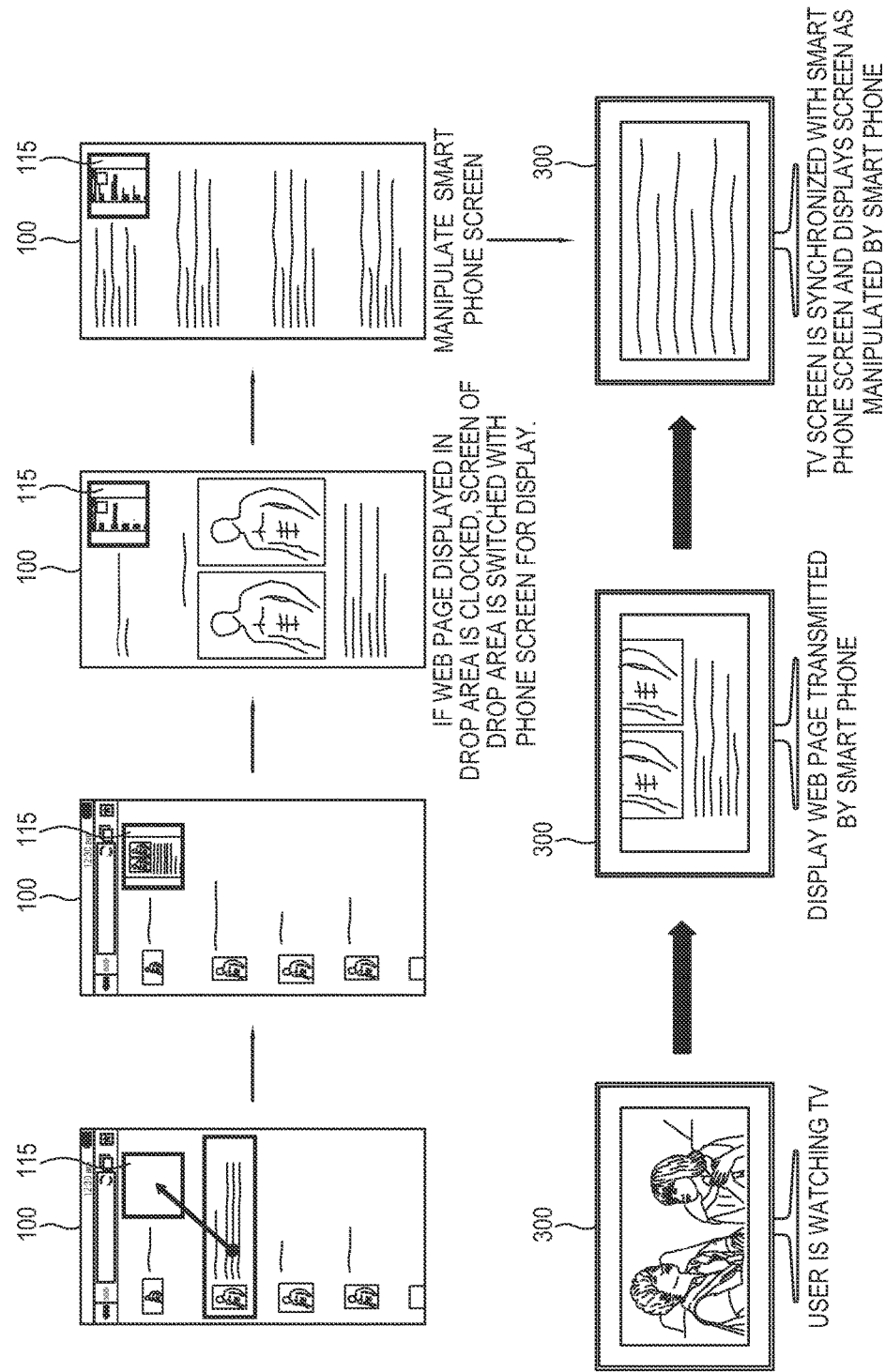
FIG. 9 illustrates an example of an operation performed by a user terminal according to another embodiment of the present disclosure.

FIG. 9 illustrates an example of an operation performed by a user terminal according to another embodiment of the present disclosure.

Referring to FIG. 9, the controller 130 may select the drop area displaying the selected part of the image and may switch the image displayed in the drop area with the image displayed on the display unit 110. The controller 130 may control the switched image displayed on the display unit 110 to thereby control the screen of the display apparatus 300. For example, as shown in FIG. 9, a web page is displayed in a screen of the user terminal 100, and at least a part of the web page selected by a user is displayed in the drop area 115. If the web page displayed in the drop area 115 is clicked or double-clicked and selected, the screen of the user terminal 100 is switched with the screen of the drop area 115. The screen of the user terminal 100 displays the selected part of the web page that has been displayed in the drop area 115, and the drop area 115 displays the web page that has been displayed in the screen of the user terminal 100. If the web page displayed in the screen of the user terminal 100 is scrolled up and down or otherwise manipulated, the screen of the display apparatus 300 that is connected to the screen of the user terminal 100 is synchronized and the screen manipulated from the user terminal 100 is equally displayed in the display apparatus 300. The user may scroll the content of the web page up and down from the screen of the user terminal 100 and display the scrolled screen in the TV screen by using the switching function for switching the screen of the user terminal 100 with the screen of the drop area 115.

If an image that is displayed in the drop area is content, the controller 130 may transmit synchronization information of the content to the display apparatus 300. If a video or a movie content is selected and displayed in the drop area, the display apparatus 300 that is connected to the user terminal 100 displays and plays the video or movie content transmitted by the user terminal 100, and if the video or movie content is played, paused, stopped, or rewound from the user terminal 100, the display apparatus 200 is synchronized with the user terminal 100 and equally displays the playing status of the user terminal 100.

Features of a control method of the user terminal 100 are described below with reference to FIGS. 2 and 3, and FIGS. 6 to 9 as necessary.

Figure 2:
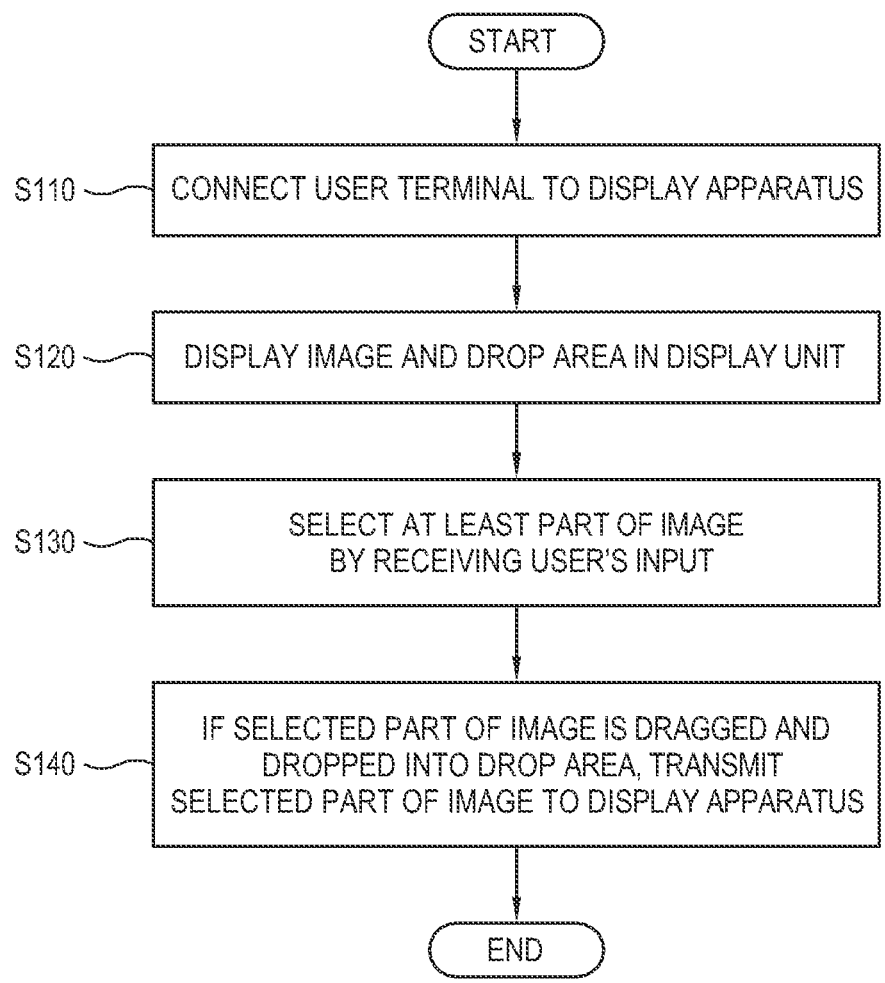
FIG. 2 is a flowchart showing a control method of a user terminal according to an embodiment of the present disclosure.

FIG. 2 is a flowchart showing a control method of a user terminal according to an embodiment of the present disclosure.

Referring to FIG. 2, the user terminal 100 is connected to the display apparatus 300 at operation S110. If the user terminal 100 is connected to a plurality of display apparatuses 300, a user may select at least one display apparatus to which he/she intends to transmit an image. The image and the drop area are displayed on the display unit 110, and the drop area is displayed as a movable pop-up at operation S120. The user's input is received and at least a part of the image is selected at operation S130. If the selected part of the image is dragged and dropped into the drop area, the selected part of the image is transmitted to the display apparatus 300 at operation S140. If at least one of the plurality of display apparatuses 300 is selected, different images may be selected and transmitted to the respective display apparatuses 300.

Figure 3:
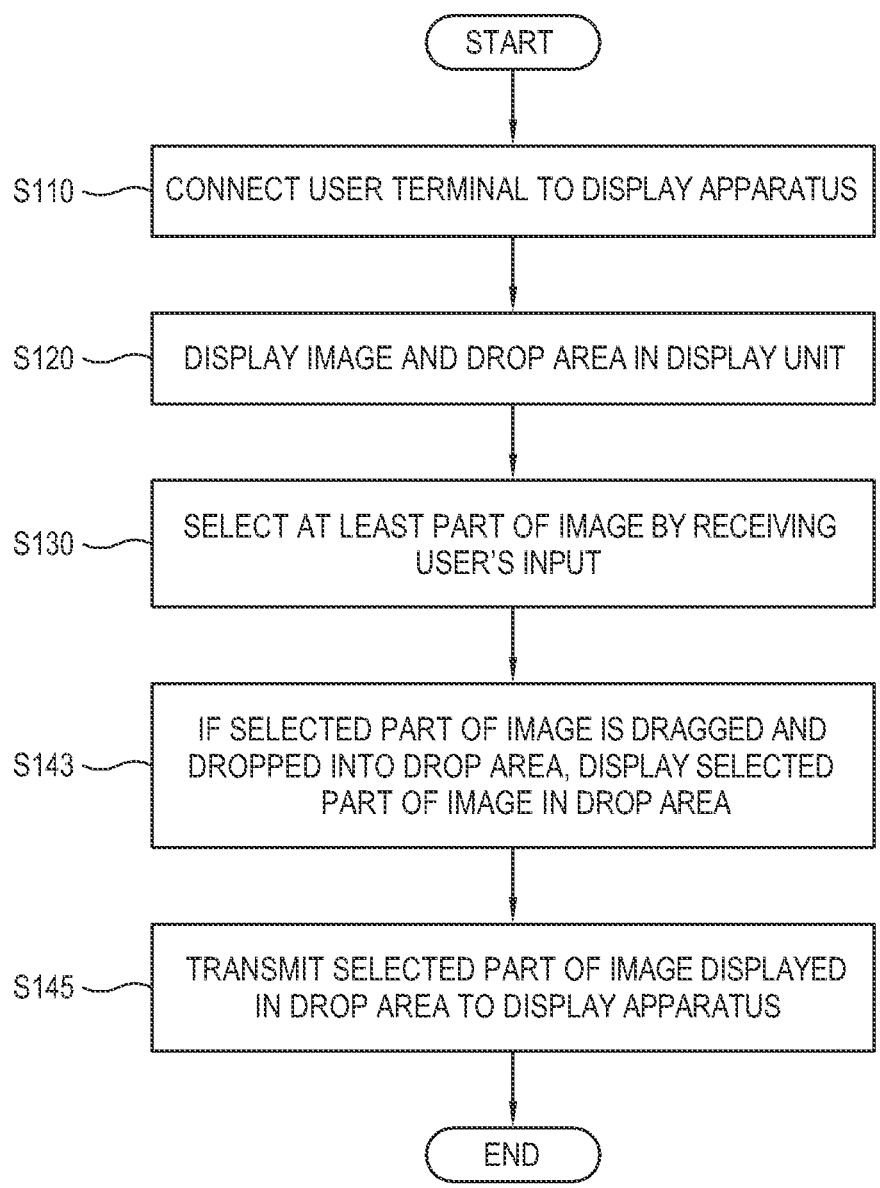
FIG. 3 is a flowchart showing a control method of a user terminal according to another embodiment of the present disclosure.

FIG. 3 is a flowchart showing a control method of the user terminal 100 according to another embodiment of the present disclosure. FIG. 3 is a detailed flowchart showing added operations from the flowchart in FIG. 2.

Referring to FIG. 3, the user terminal 100 is connected to the display apparatus 300 at operation S110. The image and the drop area are displayed on the display unit 110 at operation S120. A user's input is received and at least a part of the image is selected at operation S130. If the selected part of the image is dragged and dropped into the drop area, the selected part of the image is displayed in the drop area at operation S143. The selected part of the image that is displayed in the drop area is transmitted to the display apparatus 300 at operation S145.

For example, as shown in FIG. 6, the user terminal 100 displays a photographic image and the drop area 115 in the screen after being connected to the display apparatus 300 to the user terminal 100. A user selects at least a part of the photographic image by using an input means such as a finger, a touch pen or a keypad, and if a user drags and drops the selected part of the photo into the drop area 115, the selected photographic image is displayed in the drop area 115, and the displayed photographic image is transmitted to the display apparatus 300 that has been connected to the user terminal 100 by a user. The user then views the photographic image that has been transmitted by the user terminal 100 and is currently displayed in the screen of the display apparatus 300. As another example, as shown in FIG. 7, the user terminal 100 displays a web page and the drop area 115 in a screen, and a user selects at least a part of the web page and drags the selected part of the web page into the drop area 115 to display the selected part in the drop area 115. The web page that is displayed in the drop area 115 is transmitted to the display apparatus 300 that has been connected to the user terminal 100 by a user, and a user who is watching TV views the web page that has been transmitted by the user terminal 100 and is currently displayed in the screen of the display apparatus 300.

According to another embodiment of the present disclosure, if an image displayed on the display unit 110 is changed, the image displayed in the drop area 115 may be maintained. As shown in FIG. 8, if an event for informing an arrival of a new message occurs or another application is executed while the user terminal 100 displays a photographic image therein, the drop area 115 which displays the photographic image selected by a user maintains the displayed photographic image, and the display apparatus 300 connected to the user terminal 100 also maintains its screen displaying the photographic image.

According to another embodiment of the present disclosure, the drop area 115 that displays the selected part of the image therein may be selected and the image displayed in the drop area 115 may be switched with the image displayed on the display unit 110. The switched image displayed on the display unit 110 may be controlled to thereby control the screen of the display apparatus 300. As shown in FIG. 9, the screen of the user terminal 100 displays a web page, and the selected part of the web page is displayed in the drop area 115. If the web page that is displayed in the drop area 115 is clicked or double-clicked and selected, the screen of the user terminal 100 is switched with the screen of the drop area 115. If the web page that is displayed in the screen of the user terminal 100 is scrolled up and down or otherwise manipulated, the screen of the display apparatus 300 connected to the screen of the user terminal 100 is synchronized therewith and equally displays the manipulated screen of the user terminal 100. The operation S145 for transmitting the selected part of the image that is displayed in the drop area to the display apparatus 300 may include transmitting synchronization information of content to the display apparatus 300 if the image displayed in the drop area includes the content. For example, if a video or a movie content is selected and displayed in the drop area 115 of the user terminal 100, the connected display apparatus 300 may display and play the video or movie content that has been transmitted by the user terminal 100, and if the video or movie content displayed in the user terminal 100 is played, paused, stopped or rewound, the display apparatus 300 is synchronized with the user terminal 100 and may equally display the playing status of the user terminal 100.

Features of respective elements of the user terminal 100 according to another embodiment of the present disclosure are described below with reference to FIG. 4, and FIGS. 10 and 12 as necessary.

Figure 4:
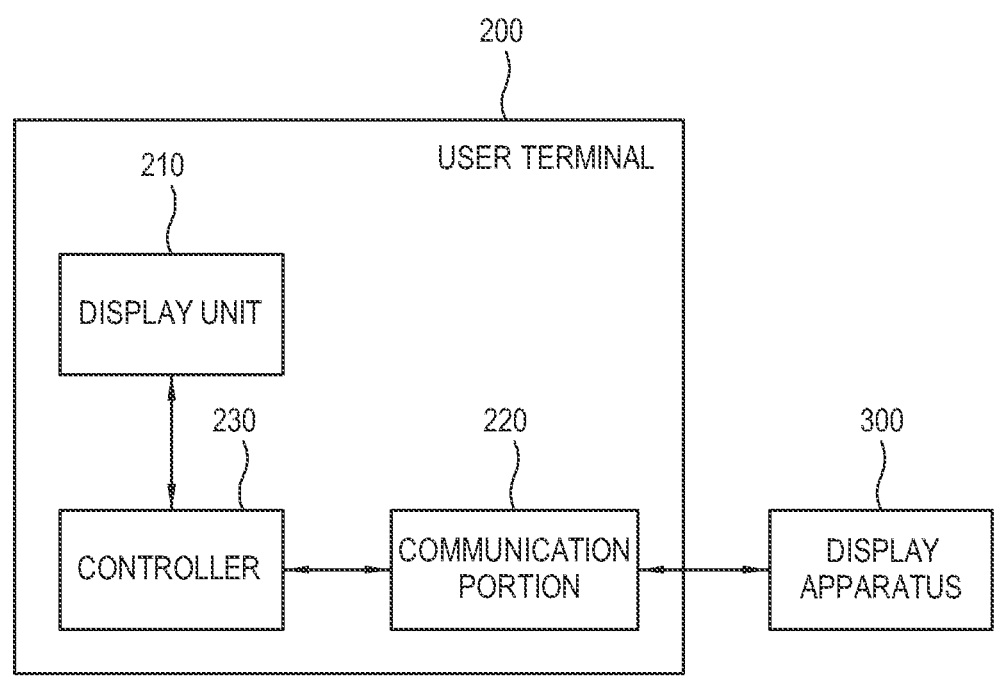
FIG. 4 is a block diagram of a user terminal according to another embodiment of the present disclosure.

FIG. 4 is a block diagram of a user terminal according to another embodiment of the present disclosure.

Referring to FIG. 4, a user terminal 200 includes a display unit 210, a communication portion 220 and a controller 230, and is connected to a display apparatus 300. The user terminal 200 may be implemented as, for example, a smart phone, and the display apparatus 300 may be implemented as a TV, a PC, a laptop computer or a tablet PC. The user terminal 200 is connected to the display apparatus 300 and displays a User Interface (UI) therein including a plurality of items. The user terminal 200 determines a reconfigured UI including a preset item of a plurality of items or including items except for at least one item selected by a user by receiving a user's input, and transmits information of the determined reconfigured UI information to the display apparatus 300. The user terminal 200 determines the reconfigured UI including the item selected by a user and transmits the information to the display apparatus 300 to thereby enable a user to check the status of the user terminal 200 from the display apparatus 300 without privacy infringement.

The communication portion 220 is connected to the display apparatus 300. For example, the communication portion 220 may be connected to the display apparatus 300, and as another example, may be connected to a plurality of display apparatuses 300.

The display unit 210 displays a UI, including a plurality of items. The plurality of items may include at least one of a message reception by the user terminal 200, call reception by the user terminal 200, remaining battery power, sound mode, and vibration mode. The display unit 210 may be implemented as various displays including, without limitation, a PDP, an LCD, an OLED, and a flexible display.

The controller 230 determines a reconfigured UI including a preset item of a plurality of items or including items except for at least one item selected by a user by receiving a user's input, and controls the communication portion 220 to transmit information of the determined reconfigured UI to the display apparatus 300. In determining the reconfigured UI, the user terminal 200 may use property information of the plurality of items. The property information includes information of properties of items showing what the plurality of items is related to. The properties of the items may include relationship of the items with a user's privacy. Whether an item is related to a user's privacy may be determined in advance by taking into account functions of the item. For example, functions such as call, text, and Social Networking Service (SNS) may be determined to be highly related to a user's privacy. The predetermined properties information may correspond to the plurality of items and may be stored in advance in the user terminal 200. In determining the reconfigured UI, the user terminal 200 may refer to the properties information and automatically extract items that are not related to privacy and create the reconfigured UI.

According to another embodiment of the present disclosure, the properties information may be designated by a user. For example, a user may designate items that the user thinks are related to the user's privacy, out of a plurality of items. The user terminal 200 may display a UI for designating properties of the items, and receive a user's input for designation through the displayed UI. The user terminal 200 may set property information of the item designated by a user, as those related to a user's privacy. In determining the reconfigured UI, the user terminal 200 may refer to the set properties information and exclude the item related to privacy.

Figure 10:
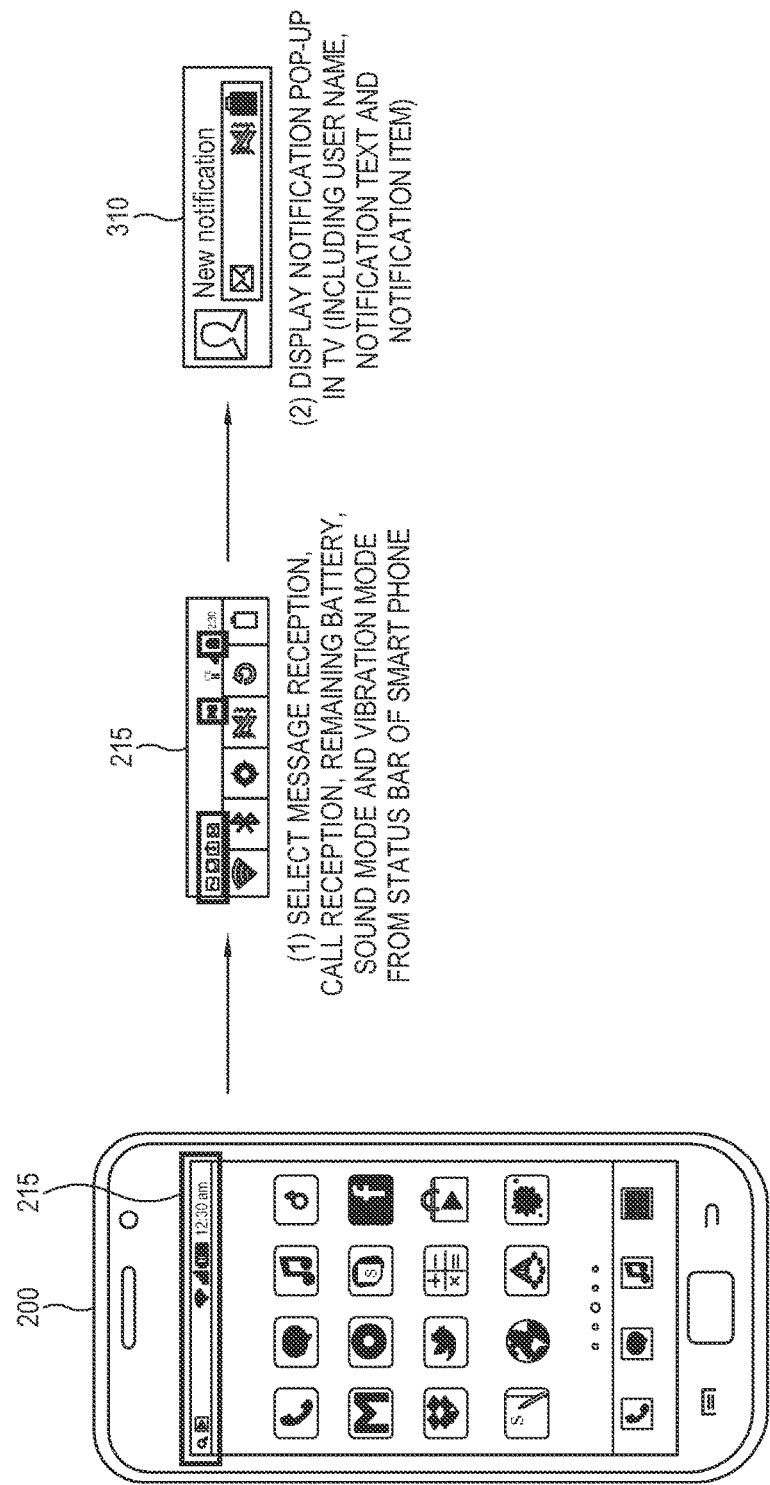
FIG. 10 illustrates an example of transmitting status notification information of a user terminal to a display apparatus and displaying the status notification information in the display apparatus according to another embodiment of the present disclosure.

FIG. 10 illustrates an example of transmitting status notification information of a user terminal to a display apparatus and displaying the status notification information in the display apparatus according to another embodiment of the present disclosure.

Referring to FIG. 10, a user may create a reconfigured UI including a desired part of a plurality of items in real-time. For example, as shown in FIG. 10, a user may select items related to privacy such as caller, caller's telephone number, the content of messages, and received content of SNS, from items of a status bar 215 showing the status of the user terminal 200, and may determine the reconfigured UI including items such as message reception, call reception, remaining battery, sound mode, and vibration mode excluding the items related to privacy. Out of items of the status bar 215 showing the status of the user terminal 200, property information of items related to privacy such as caller, caller's telephone number, the content of messages, and received content of SNS, and properties information of items unrelated to privacy such as message reception, call reception, remaining battery, sound mode and vibration mode may be separately stored in advance. If service is implemented, the reconfigured UI including only the properties information unrelated to privacy may be determined.

The reconfigured UI may be formed by including items selected by a user, and even without a user's selection, may be automatically formed by including only the items unrelated to privacy by using the properties information stored in advance in the user terminal 200. The reconfigured UI is formed as a notification pop-up 310 showing the status of the user terminal 200 and displayed in the display apparatus 300 such as a TV, and if a user implements a notification pop-up service after connecting the display apparatus 300 to the user terminal 200 such as a smart phone, the determined reconfigured UI (i.e., the notification pop-up 310), is displayed in the TV screen. A user may check the notification pop-up 310 while watching TV to thereby check whether the user terminal 200 located in another place has received any text message or call, and check the remaining battery or check whether the user terminal 200 is set in sound mode or vibration mode.

Figure 11:
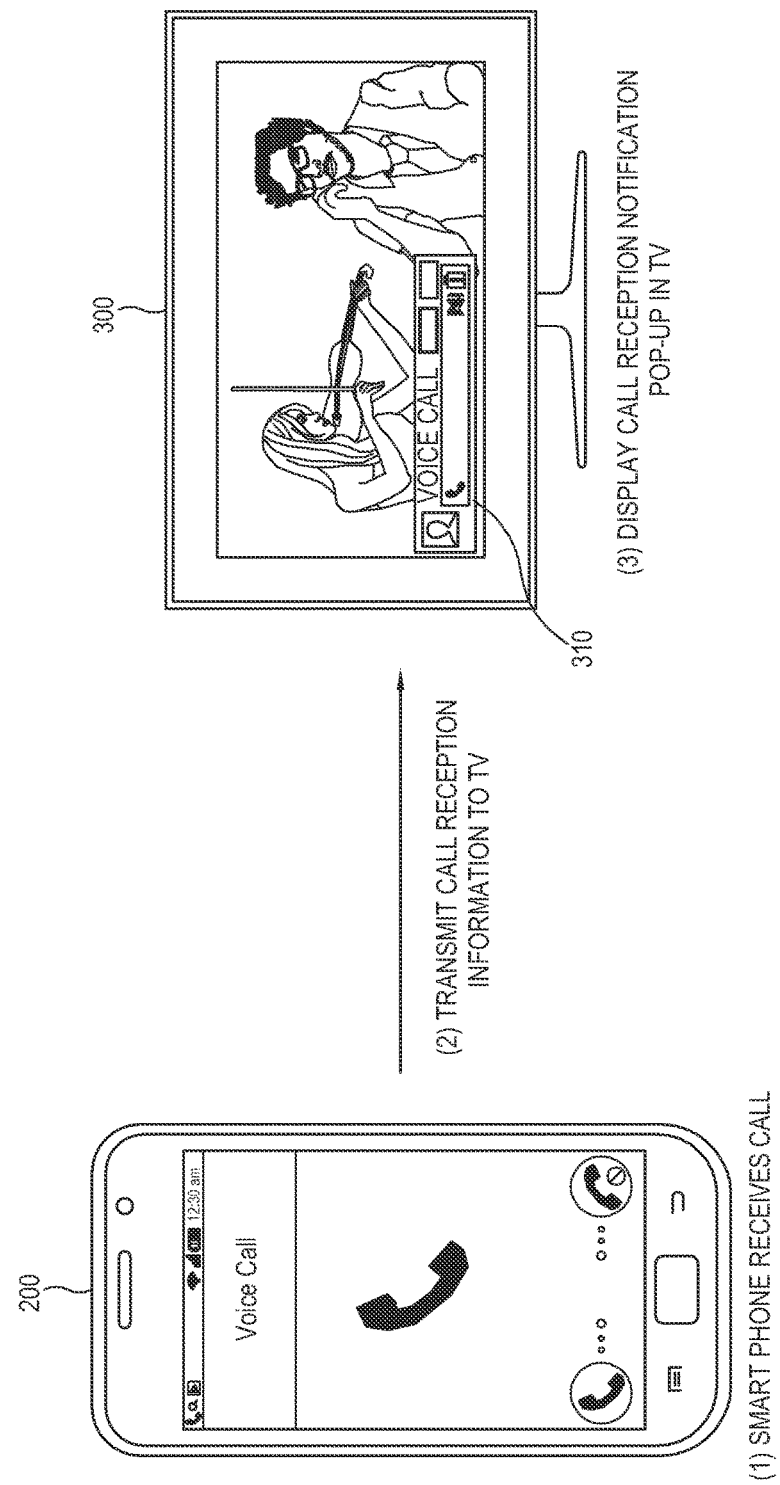
FIG. 11 illustrates an example of an operation for transmitting incoming call notification information to a display apparatus according to another embodiment of the present disclosure.
Figure 12:
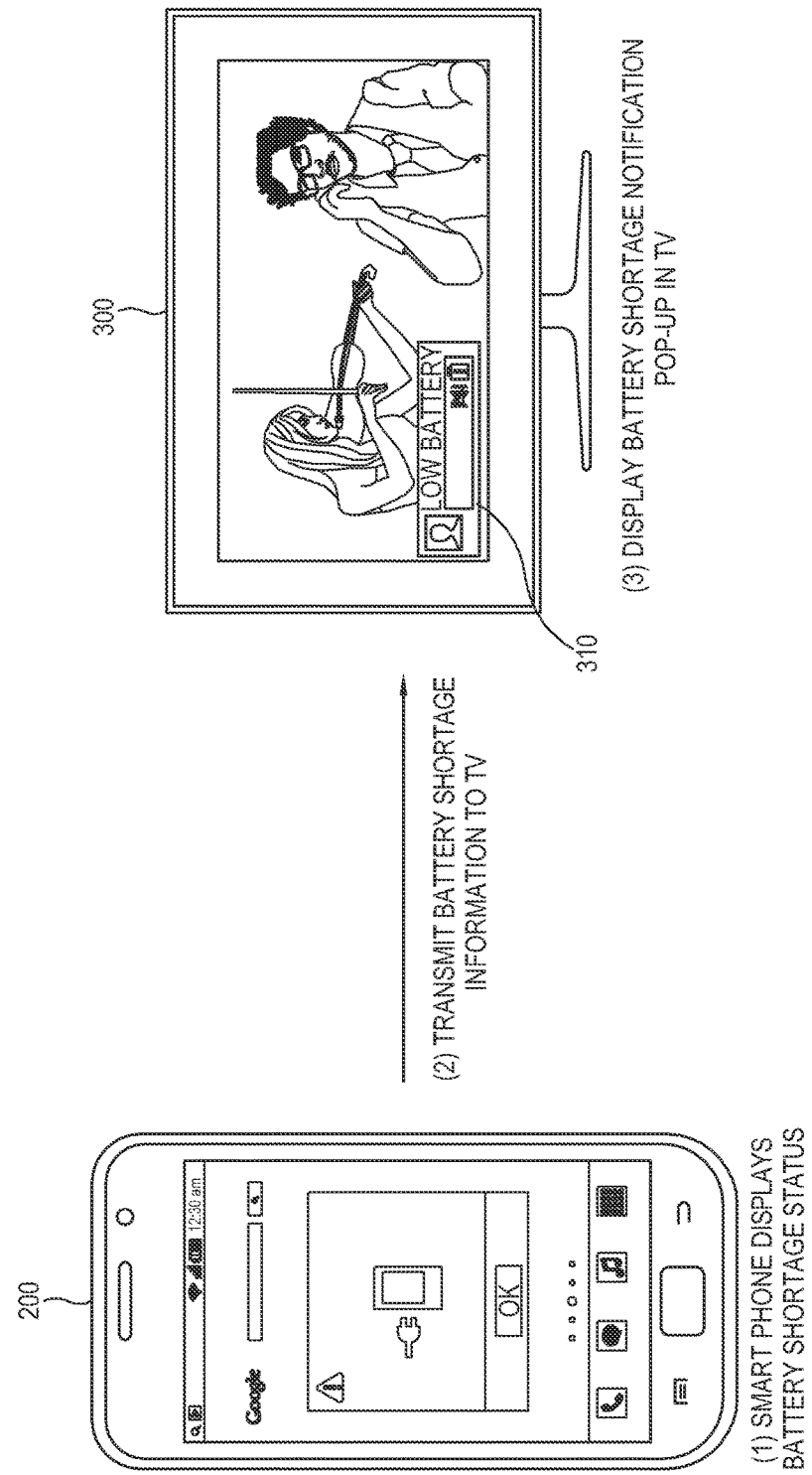
FIG. 12 illustrates an example of an operation for transmitting battery shortage notification information to the display apparatus according to another embodiment of the present disclosure.

FIG. 11 illustrates an example of an operation for transmitting incoming call notification information to the display apparatus according to another embodiment of the present disclosure and FIG. 12 illustrates an example of an operation for transmitting battery shortage notification information to the display apparatus according to another embodiment of the present disclosure.

Referring to FIGS. 11 and 12, if a predetermined event occurs with respect to a part of items included in the reconfigured UI, the controller 230 may transmit event occurrence information to the display apparatus 300. For example, as shown in FIG. 11, if an incoming call occurs, the user terminal 200 may transmit call reception information to the display apparatus 300 and display the information in the notification pop-up 310. The notification pop-up 310 displays only the call reception status rather than the caller, caller's telephone number, and the like that are stored in advance as the items related to privacy. The user may check that the user terminal 200 located in another place has received a call, through the notification pop-up 310 displayed in the TV while watching TV. If the user desires to answer the phone call, the user may manipulate a remote controller or keyboard and immediately enter a calling mode. To facilitate answering the phone call, TV volume is automatically reduced, and a TV microphone is changed to a calling mode. As another example, if the user checks through the notification pop-up 310 that the user terminal 200 has received a call and if the user attempts to answer the phone call while watching TV, a video call function rather than voice call may be provided. The user may start the video call by manipulating a remote controller or a keyboard, and in such case, TV camera and microphone are enabled and a user may answer the phone call, viewing an image of the caller through the TV screen.

As another example, as shown in FIG. 12, when an event of battery shortage occurs, the user terminal 200 may transmit battery shortage information to the display apparatus 300 and display a notification pop-up 310 in the display apparatus 300. The battery shortage information may be automatically displayed in the notification pop-up 310 since the information is stored in advance as an item unrelated to privacy in the user terminal 200. If the remaining battery of the user terminal 200 located in another place is below a preset value, the user may immediately check through the notification pop-up 310 that the battery runs short. Since the battery shortage of the user terminal 200 may be checked in advance, a user may prevent the user terminal 200 from running out of the battery and being automatically turned off.

Features of respective elements of the user terminal 200 according to the embodiment are described below with reference to FIG. 5, and FIGS. 10 and 12 if necessary.

Figure 5:
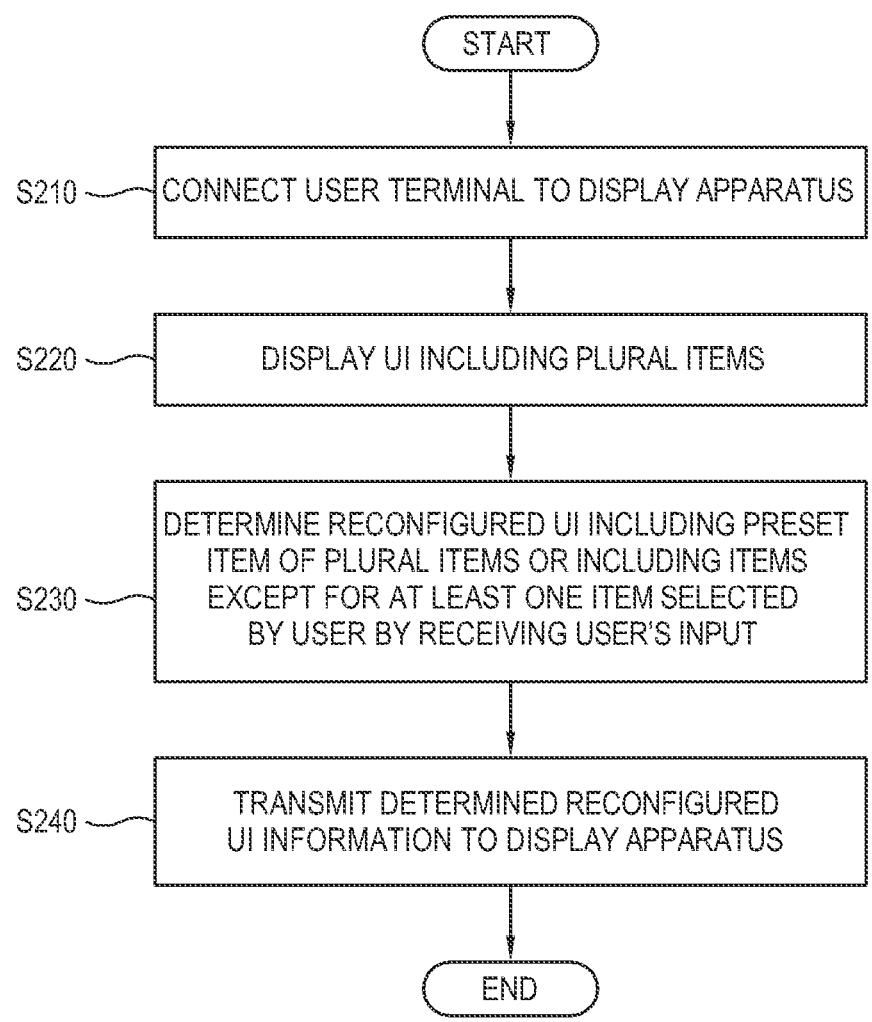
FIG. 5 is a flowchart showing a control method of a user terminal according to another embodiment of the present disclosure.

FIG. 5 is a flowchart showing a control method of a user terminal according to another embodiment of the present disclosure.

Referring to FIG. 5, the user terminal 200 is connected to the display apparatus 300 at operation S210. The UI including a plurality of items is displayed at operation S220. The plurality of items may include at least one of message reception by the user terminal 200, call reception by the user terminal 200, remaining battery, sound mode and vibration mode. A user's input is received and the reconfigured UI including a preset item of a plurality of items or including items except for at least one item selected by a user is determined at operation S230. The determined reconfigured UI information is transmitted to the display apparatus 300 at operation S240.

For example, as shown in FIG. 10, a reconfigured UI including items such as message reception, call reception, remaining battery, sound mode, and vibration mode, except for the items related to privacy such as caller, caller's telephone number, the content of messages, received content of SNS from the items in the status bar 215 showing the status of the user terminal 200 is determined. If a user implements the notification pop-up service, the determined reconfigured UI, i.e., the notification pop-up 310 is displayed in the TV screen. If a predetermined event occurs with respect to items included in the reconfigured UI, the event occurrence information may be transmitted to the display apparatus 300. For example, as shown in FIG. 11, if an event of incoming call occurs, the user terminal 200 may transmit call reception information to the display apparatus 300 and display the information in the notification pop-up 310. As another example, as shown in FIG. 12, if an event of battery shortage occurs, the user terminal 200 may transmit battery shortage information to the display apparatus 300 and display the information in the notification pop-up 310.

As described above, the user terminal and the control method thereof according to various embodiments may display a part of the image selected by a user, in a drop area, and transmit the part of image to the display apparatus so as to enable a user to share the image of the user terminal with the display apparatus.

Also, the user terminal and the control method thereof according to various embodiments may transmit reconfigured UI information including a preset item of a plurality of items or including items except for items selected by a user, to the display apparatus so as to enable a user to check the status of the user terminal from the display apparatus without privacy infringement.

At this point it should be noted that various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include Read-Only Memory (ROM), Random-Access Memory (RAM), CD-ROMs, magnetic tapes, floppy disks, and optical data storage devices. The processor readable mediums can also be distributed over network coupled computer systems so that the instructions are stored and executed in a distributed fashion. Also, functional computer programs, instructions, and instruction segments for accomplishing the present disclosure can be easily construed by programmers skilled in the art to which the present disclosure pertains.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A user terminal comprising:
a display configured to display a web page in a first area;
a transceiver configured to be connected to a display apparatus; and
at least one processor configured to:
display a movable pop-up drop area in a part of the first area in response to a predetermined service being executed while the web page is displayed on the first area,
select at least one item of a plurality of items included in the web page displayed on the first area by receiving a user's input,
in response to the selected at least one item of the web page being dragged into the movable pop-up drop area, display the at least one item of the web page in the movable pop-up drop area and control the transceiver to transmit the at least one item of the web page to the display apparatus,
in response to a user's input on the movable pop-up drop area, switch a screen of the movable pop-up drop area with a screen of the web page in the first area, thereby displaying the at least one item of the web page in the first area and the web page in the movable pop-up drop area, and
transmit a user command for manipulating the at least one item of the web page to the display apparatus.

2. The user terminal of claim 1, wherein the at least one processor is further configured to display the selected at least one item of the web page in the movable pop-up drop area if the selected at least one item of the web page is dragged and dropped into the movable pop-up drop area.

3. The user terminal of claim 2, wherein the at least one processor is further configured to maintain the at least one item of the web page displayed in the movable pop-up drop area if the web page displayed on the screen is changed.

4. The user terminal of claim 2, wherein the at least one processor is further configured to transmit synchronization information of content to the display apparatus if the at least one item of the web page displayed in the movable pop-up drop area is the content.

5. The user terminal of claim 1, wherein the at least one processor is further configured to control the switched web page displayed on the screen to control a screen of the display apparatus.

6. A control method of a user terminal comprising:
connecting to a display apparatus;
displaying a web page in a first area of a display;
displaying a movable pop-up drop area in a part of the first area in response to a predetermined service being executed while the web page is displayed on the first area;
selecting at least one item of a plurality of items included in the web page by receiving a user's input;
in response to the selected at least one item of the web page being dragged into the movable pop-up drop area, displaying the at least one item of the web page in the movable pop-up drop area and transmitting the at least one item of the web page to the display apparatus;
in response to a user's input on the movable pop-up drop area, switch a screen of the movable pop-up drop area with a screen of the web page in the first area, thereby displaying the at least one item of the web page in the first area and the web page in the movable pop-up drop area; and
transmitting a user command for manipulating the at least one item of the web page to the display apparatus.

7. The control method of claim 6, wherein if the selected at least one item of the web page is dragged and dropped into the movable pop-up drop area, displaying the selected at least one item of the web page in the movable pop-up drop area.

8. The control method of claim 7, further comprising:
if the web page of the screen is changed, maintaining the at least one item of the web page displayed in the movable pop-up drop area.

9. The control method of claim 7, wherein the transmitting to the display apparatus comprises:
if the at least one item of the web page displayed in the movable pop-up drop area is content, transmitting synchronization information of the content to the display apparatus.

10. A non-transitory computer-readable storage medium storing instructions that, when executed, cause at least one processor to perform the method of claim 6.

* * * * *